United States Patent [19]

Otsuka

[11] Patent Number: 5,714,987
[45] Date of Patent: Feb. 3, 1998

[54] METHOD OF EQUALLY ADJUSTING LINE WIDTHS OF OUTLINE FONT

[76] Inventor: Yoshiro Otsuka, SH Mansion Honkugenuma 201, 12-21, Honkugenuma 2-chome, Fujisawa-shi, Kanagawa-ken 251, Japan

[21] Appl. No.: 163,796

[22] Filed: Dec. 9, 1993

Related U.S. Application Data

[63] Continuation of PCT/JP92/00716 Jun. 3, 1992, now abandoned.

[30] Foreign Application Priority Data

Jun. 10, 1991 [JP] Japan ................... 3-233638

[51] Int. Cl.$^6$ ....................................... G06F 3/00
[52] U.S. Cl. .................. 345/467; 345/468; 345/469; 345/472
[58] Field of Search ..................... 395/150, 151, 395/141, 805, 167, 168, 169, 170, 171, 172; 345/143, 144, 127

[56] References Cited

U.S. PATENT DOCUMENTS

| | | | |
|---|---|---|---|
| 4,675,830 | 6/1987 | Hawkins | 395/151 |
| 4,785,391 | 11/1988 | Apley et al. | 395/150 |
| 4,931,953 | 6/1990 | Uehara et al. | 395/151 |
| 5,050,103 | 9/1991 | Schiller et al. | 395/150 |
| 5,295,240 | 3/1994 | Kajimoto | 395/151 |

FOREIGN PATENT DOCUMENTS

| | | |
|---|---|---|
| 59-765 | 1/1984 | Japan . |
| 59-69787 | 4/1984 | Japan . |
| 63-208898 | 8/1988 | Japan . |
| 63-251492 | 4/1990 | Japan . |
| 2-197895 | 8/1990 | Japan . |
| 3-33896 | 2/1991 | Japan . |
| 3-38691 | 2/1991 | Japan . |

*Primary Examiner*—Heather R. Herndon
*Assistant Examiner*—Stephen Hong
*Attorney, Agent, or Firm*—Morrison & Foerster LLP

[57] ABSTRACT

An apparatus for adjusting a line width of an outline font includes an original outline data storing device for storing attribute data in advance. The attribute data indicates whether a data point, which represents a contour line of a character of an outline font, is a point at which line width is to be adjusted. The attribute data is stored in correspondence with original coordinate-value data of the data point. Also provided is an original line-width data storing device for storing data representing original line width in correspondence with original outline data of each character; and a line-width converting device for converting original line-width data into fraction-processed output line-width data in conformity with a mesh size corresponding to a designated character size. A coordinate-value converting device, which is operative when original coordinate-value data read out of the original outline data storing device is accompanied by attribute data indicating that line width is to be adjusted, converts the original coordinate-value data into fraction-processed output coordinate-value data using the fraction-processed output line-width data such that a line width stipulated by the fraction-processed output coordinate-value data becomes equal to a line width represented by the fraction-processed output line-width data.

10 Claims, 9 Drawing Sheets

Fig. 2a

D = 2 8  LINE-WIDTH CATEGORY DATA: 1 ONLY

| POINT NO. | X COORDINATE VALUE | Y COORDINATE VALUE | ATTRIBUTE DATA | LINE-WIDTH CATEGORY DATA |
|---|---|---|---|---|
| $P_0$ | 192 | 53 | 0 | 0 |
| $P_1$ | 192 | 923 | 0 | 0 |
| $P_2$ | 274 | 884 | 1 | 1 |
| $P_3$ | 722 | 884 | 1 | 1 |
| $P_4$ | 752 | 923 | 0 | 0 |
| $P_5$ | 834 | 872 | 0 | 0 |
| $P_6$ | 840 | 860 | 0 | 0 |
| $P_7$ | 842 | 854 | 0 | 0 |
| $P_8$ | 836 | 852 | 0 | 0 |
| $P_9$ | 830 | 846 | 0 | 0 |
| $P_{10}$ | 808 | 842 | 0 | 0 |
| $P_{11}$ | 808 | 82 | 0 | 0 |
| $P_{12}$ | 738 | 70 | 0 | 0 |
| $P_{13}$ | 738 | 128 | 2 | 1 |
| $P_{14}$ | 262 | 128 | 2 | 1 |
| $P_{15}$ | 262 | 65 | 0 | 0 |
| $P_{16}$ | 192 | 53 | 0 | 0 |

Fig.2b

| POINT NO. | X COORDINATE VALUE | Y COORDINATE VALUE | ATTRIBUTE DATA | LINE-WIDTH CATEGORY DATA |
|---|---|---|---|---|
| $P_{17}$ | 262 | 648 | 1 | 1 |
| $P_{18}$ | 738 | 648 | 1 | 1 |
| $P_{19}$ | 738 | 856 | 2 | 1 |
| $P_{20}$ | 262 | 856 | 2 | 1 |
| $P_{21}$ | 262 | 648 | 1 | 1 |
| $P_{22}$ | 262 | 416 | 1 | 1 |
| $P_{23}$ | 738 | 416 | 1 | 1 |
| $P_{24}$ | 738 | 620 | 2 | 1 |
| $P_{25}$ | 262 | 620 | 2 | 1 |
| $P_{26}$ | 262 | 416 | 1 | 1 |
| $P_{27}$ | 262 | 388 | 2 | 1 |
| $P_{28}$ | 262 | 156 | 1 | 1 |
| $P_{29}$ | 738 | 156 | 1 | 1 |
| $P_{30}$ | 738 | 388 | 2 | 1 |
| $P_{31}$ | 262 | 388 | 2 | 1 |

⌐ END POINT AT WHICH CLOSED OUTER OR INNER CONTOUR STARTS
— END POINT
> TANGENTIAL POINT AT TRANSITION FROM STRAIGHT LINE TO CURVE OR VICE VERSA
- POINT THAT DECIDES CURVATURE OF CURVED LINE

Fig. 6a $D_1 = 60$    LINE-WIDTH CATEGORY DATA:
$D_2 = 70$    1, 2, 3
$D_3 = 80$

| POINT NO. | X COORDINATE VALUE | Y COORDINATE VALUE | ATTRIBUTE DATA | LINE-WIDTH CATEGORY DATA |
|---|---|---|---|---|
| $P_0$ | 115 | 933 | 1 | 3 |
| $P_1$ | 885 | 933 | 1 | 3 |
| $P_2$ | 885 | 593 | 2 | 3 |
| $P_3$ | 115 | 593 | 2 | 3 |
| $P_4$ | 115 | 933 | 1 | 3 |
| $P_5$ | 209 | 798 | 1 | 2 |
| $P_6$ | 789 | 798 | 1 | 2 |
| $P_7$ | 789 | 853 | 2 | 3 |
| $P_8$ | 209 | 853 | 2 | 3 |
| $P_9$ | 209 | 798 | 1 | 2 |
| $P_{10}$ | 209 | 728 | 2 | 2 |
| $P_{11}$ | 209 | 673 | 1 | 3 |
| $P_{12}$ | 789 | 673 | 1 | 3 |
| $P_{13}$ | 789 | 728 | 2 | 2 |
| $P_{14}$ | 209 | 728 | 2 | 2 |
| $P_{15}$ | 702 | 93 | 2 | 2 |
| $P_{16}$ | 286 | 93 | 2 | 2 |
| $P_{17}$ | 286 | 53 | 0 | 0 |
| $P_{18}$ | 190 | 53 | 0 | 0 |
| $P_{19}$ | 190 | 543 | 1 | 2 |
| $P_{20}$ | 798 | 543 | 1 | 2 |
| $P_{21}$ | 798 | 56 | 0 | 0 |
| $P_{22}$ | 702 | 56 | 0 | 0 |
| $P_{23}$ | 702 | 93 | 2 | 2 |
| $P_{24}$ | 702 | 473 | 2 | 2 |

Fig.6b

| POINT NO. | X COORDINATE VALUE | Y COORDINATE VALUE | ATTRIBUTE DATA | LINE-WIDTH CATEGORY DATA |
|---|---|---|---|---|
| $P_{25}$ | 286 | 473 | 2 | 2 |
| $P_{26}$ | 286 | 413 | 1 | 1 |
| $P_{27}$ | 702 | 413 | 1 | 1 |
| $P_{28}$ | 702 | 473 | 2 | 2 |
| $P_{29}$ | 702 | 288 | 1 | 1 |
| $P_{30}$ | 702 | 353 | 2 | 1 |
| $P_{31}$ | 286 | 353 | 2 | 1 |
| $P_{32}$ | 286 | 288 | 1 | 1 |
| $P_{33}$ | 702 | 288 | 1 | 1 |
| $P_{34}$ | 702 | 228 | 2 | 1 |
| $P_{35}$ | 286 | 228 | 2 | 1 |
| $P_{36}$ | 286 | 163 | 1 | 2 |
| $P_{37}$ | 702 | 163 | 1 | 2 |
| $P_{38}$ | 702 | 228 | 2 | 1 |

METHOD OF EQUALLY ADJUSTING LINE WIDTHS OF OUTLINE FONT

REFERENCE TO RELATED APPLICATION

This application is a continuation of International application No. PCT/JP92/00716, filed Jun. 3, 1992, and as amended Jan. 28, 1993, now abandoned.

1. Field of the Invention

This invention relates to an apparatus and method for storing beforehand, in a memory such as a ROM or RAM, original outline vector data (abbreviated as "original outline data"), which is a collection of coordinate-value data of data points representing the outline of a character of an outline vector font (abbreviated as "outline font"), and subjecting the original outline data to an enlargement or reduction operation in conformity with a mesh size that corresponds to the size of a designated output character, thereby generating output outline data comprising a collection of output coordinate-value data, wherein the line width of a horizontal or vertical line constituting an output character represented by the output outline data, especially a kanji character to be printed or displayed, is adjusted so as to maintain a high character quality.

2. Description of the Related Art

When an outline font that has been set in advance is reduced in size to print or display a small character, there are instances in which the line widths of the outputted character become uneven owing to rounding processing (processing for counting fractions following the decimal point as a whole number, for rounding to the nearest whole number or for disregarding fractions) executed in the reduction operation. In particular, many kanji characters contain a plurality of horizontal lines. Even if the line widths of these plurality of horizontal lines have been set equally in the outline font, an error of at least one dot occurs owing to processing of fractions in the reduction operation, and situations arise in which the horizontal lines of the outputted character contain a mixture of thick lines and thin lines. In addition, in a case where the size of an output character is small, a kanji character having a large number of horizontal lines is outputted upon being reduced considerably in size. When this is done, the output character becomes deformed.

SUMMARY OF THE INVENTION

An object of the present invention is to maintain a high quality for output characters by arranging it so that character lines of equal line width can be outputted as lines of equal width while character lines of differing line width can be outputted as lines of differing width.

Another object of the present invention is to prevent the deformation of complicated characters having many character lines even if the designated character size is small or even if the resolution of a printer or the like is inferior.

According to a first aspect of the present invention, line width is adjusted in such a manner that the line widths of a plurality of character lines set to have equal line widths in an outline font can be outputted while the equal line widths are maintained even after enlargement or reduction.

An apparatus for adjusting line width of an outline font according to the first aspect of the present invention comprises original outline data storing means in which attribute data is stored in advance, the attribute data indicating whether a data point, which represents a contour line of a character of an outline font, is a point at which line width is to be adjusted, the attribute data being stored in correspondence with original coordinate-value data of the data point, original line-width data storing means in which data representing original line width is stored in correspondence with original outline data of each character, line-width converting means for converting original line-width data into fraction-processed output line-width data in output outline data in conformity with mesh size corresponding to a designated character size, and coordinate-value converting means which, when original coordinate-value data read out of the original outline data storing means is accompanied by attribute data representing the fact that line width is to be adjusted, is for converting the read original coordinate-value data into fraction-processed output coordinate-value data using the output line-width data in such a manner that a line width stipulated by output coordinate-value data becomes equal to a line width represented by the output line-width data.

In a method of storing beforehand original outline data comprising a collection of original coordinate-value data of data points representing the contour lines of a character of an outline font and subjecting the original coordinate-value data to an enlargement or reduction operation in conformity with a mesh size corresponding to a designated character size, thereby generating output outline data comprising a collection of output coordinate-value data, a method of adjusting line width of an outline font according to the first aspect of the present invention comprises setting attribute data beforehand in correspondence with original coordinate-value data of each data point in the original outline data, the attribute data indicating whether a data point is a point at which line width is to be adjusted, storing data representing original line width in correspondence with original outline data of each character, converting original line-width data into fraction-processed output line-width data in conformity with the mesh size, and, when original coordinate-value data that has been read out is accompanied by attribute data representing the fact that line width is to be adjusted, converting the read original coordinate-value data into fraction-processed output coordinate-value data using the output line-width data in such a manner that a line width stipulated by output coordinate-value data becomes equal to a line width represented by the output line-width data.

In accordance with the invention, output line-width data is created from predetermined original line-width data, and the output line-width data is used to adjust all lines requiring line-width adjustment in such a manner that the output line widths become equal. As a result, it is possible to output a character having high quality in which the line widths of a plurality of character lines are rendered uniform.

Further, when output line-width data is created, it is possible to selectively set output line width to be thick, medium or thin in thickness. Since the line width of the line of a character is set so as to agree with the set line width, an optimum line-width adjustment becomes possible in conformity with the capability of a printer or the like or in accordance with other conditions upon considering the merits of the style of type.

According to a second aspect of the present invention, it is arranged so that the line widths of a plurality of lines in one and the same character can be made to differ by at least two grades, or so that line widths can be made to differ between characters, even if line widths have been set equally in an outline font.

An apparatus for adjusting line width of an outline font according to the second aspect of the present invention comprises original outline data storing means in which attribute data and line-width category data are stored in advance, the attribute data indicating whether a data point, which represents a contour line of a character of an outline font containing a plurality of character lines having equal original line widths, is a point at which line width is to be adjusted, and the line-width category data indicating the grade of thickness of line width to be made different with regard to an output line width that is to be made different depending upon mesh size of a prescribed range irrespective of the equal original line width, the attribute data and the line-width category data being stored in correspondence with original coordinate-value data of the data point, original line-width data storing means in which data representing original line width is stored in correspondence with original outline data of each character, means for creating output line-width data representing a plurality of different, fraction-processed output line widths in output outline data based upon the original line-width data and line-width category data in conformity with mesh size corresponding to a designated character size, and means which, when original coordinate-value data read out of the original outline data storing means is accompanied by attribute data representing the fact that line width is to be adjusted, is for converting the read original coordinate-value data into fraction-processed output coordinate-value data using selected output line-width data in such a manner that a line width stipulated by output coordinate-value data becomes equal to an output line width represented by output line-width data selected in accordance with the line-width category data.

In a method of storing beforehand original outline data comprising a collection of original coordinate-value data of data points representing a contour line of a character of an outline font containing a plurality of character lines having equal original line widths and subjecting the original coordinate-value data to an enlargement or reduction operation in conformity with a mesh size corresponding to a designated character size, thereby generating output outline data comprising a collection of output coordinate-value data, a method of adjusting line width of an outline font according to the second aspect of the present invention comprises setting attribute data and line-width category data beforehand in correspondence with original coordinate-value data of each data point in the original outline data, the attribute data indicating whether a data point is a point at which line width is to be adjusted and the line-width category data indicating the grade of thickness of line width to be made different with regard to an output line width that is to be made different depending upon mesh size of a prescribed range irrespective of the equal original line width, storing data representing original line width in correspondence with original outline data of each character, creating output line-width data representing a plurality of different, fraction-processed output line widths in output outline data based upon the original line-width data and line-width category data in conformity with the mesh size, and, when original coordinate-value data that has been read out is accompanied by attribute data representing the fact that line width is to be adjusted, converting the read original coordinate-value data into fraction-processed output coordinate-value data using selected output line-width data in such a manner that a line width stipulated by output coordinate-value data becomes equal to an output line width represented by output line-width data selected in accordance with the line-width category data.

In accordance with the second aspect of the present invention, the line widths of a plurality of lines in one character can be made to differ before being outputted. As a result, the invention is useful in a case where making a specific line thicker or thinner than other lines before outputting the character is better for the purpose of maintaining good quality. For example, a line forming the principal part of a character can be thickened while the lines of other complicated parts of the character can be made finer. Further, since line widths can be made to differ even among a plurality of characters, line widths can be thinned to prevent deformation also with regard to complicated characters having many lines, and simple characters can be thickened to express forcefulness. The second aspect of the invention is especially useful in a case where a designated character size is small or a case where an output device such as a printer has inferior resolution. In these cases the second aspect of the invention serves to prevent the deformation of characters when there are many character lines.

A third aspect of the present invention, which is useful in a case where the line thicknesses of a plurality of character lines are set to differ in an outline font, makes it possible to output lines having different line thicknesses as lines having different line thicknesses.

An apparatus for adjusting line width of an outline font according to the third aspect of the present invention comprises original outline data storing means in which attribute data and line-width category data are stored in advance, the attribute data indicating whether a data point, which represents a contour line of a character of an outline font containing a plurality of character lines having different original line widths, is a point at which line width is to be adjusted, and the line-width category data indicating categories of thickness of line width in correspondence with the different original line widths, original line-width data storing means in which data representing original line widths of a plurality of categories is stored in correspondence with original outline data of each character, means for converting original line-width data of a plurality of categories into fraction-processed output line-width data of a plurality of categories in output outline data in conformity with mesh size corresponding to a designated character size, and means which, when original coordinate-value data read out of the original outline data storing means is accompanied by attribute data representing the fact that line width is to be adjusted, is for converting the read original coordinate-value data into fraction-processed output coordinate-value data using selected output line-width data in such a manner that a line width stipulated by output coordinate-value data becomes equal to an output line width represented by output line-width data selected in accordance with the line-width category data.

In a method of storing beforehand original outline data comprising a collection of original coordinate-value data of data points representing a contour line of a character of an outline font containing a plurality of character lines having different original line widths and subjecting the original coordinate-value data to an enlargement or reduction operation in conformity with a mesh size corresponding to a designated character size, thereby generating output outline data comprising a collection of output coordinate-value data, a method of adjusting line width of an outline font according to the third aspect of the present invention comprises setting attribute data and line-width category data beforehand in correspondence with original coordinate-value data of each data point in the original outline data, the attribute data indicating whether a data point is a point at which line width is to be adjusted and the line-width category data indicating categories of thickness of line width in correspondence with the different original line widths, storing data representing original line widths of a plurality of categories in correspondence with original outline data of each character, converting original line-width data of a plurality of categories into fraction-processed output line-width data of a plurality of categories in output outline data in conformity with the mesh size, and, when original coordinate-value data that has been read out is accompanied by attribute data representing the fact that line width is to be adjusted, is for converting the read original coordinate-value data into fraction-processed output coordinate-value data using selected output line-width data in such a manner that a line width stipulated by output coordinate-value data becomes equal to an output line width represented by output line-width data selected in accordance with the line-width category data.

In accordance with the third aspect of the invention, original line-width data of a plurality categories set in advance is converted into output line-width data of a plurality of corresponding categories in conformity with mesh size, and a line-width adjustment is performed using these items of output line-width data. As a result, line widths can be adjusted in such a manner that lines of the same line width will have the same line width and lines of different line width will have different line widths. This makes it possible to maintain a high character quality.

The first, second and third aspects of the invention are capable of being applied to both horizontal and vertical lines constituting a character.

In accordance with the first, second and third aspects of the invention, processing for line-width adjustment is comparatively simple. As a result, waiting time is eliminated and output characters can be generated in real time.

BRIEF DESCRIPTION OF THE DRAWINGS

FIGS. 2a and 2b illustrate an example of original outline data;

FIGS. 6a and 6b illustrate another example of original outline data; and

DETAILED DESCRIPTION

Figure 1:
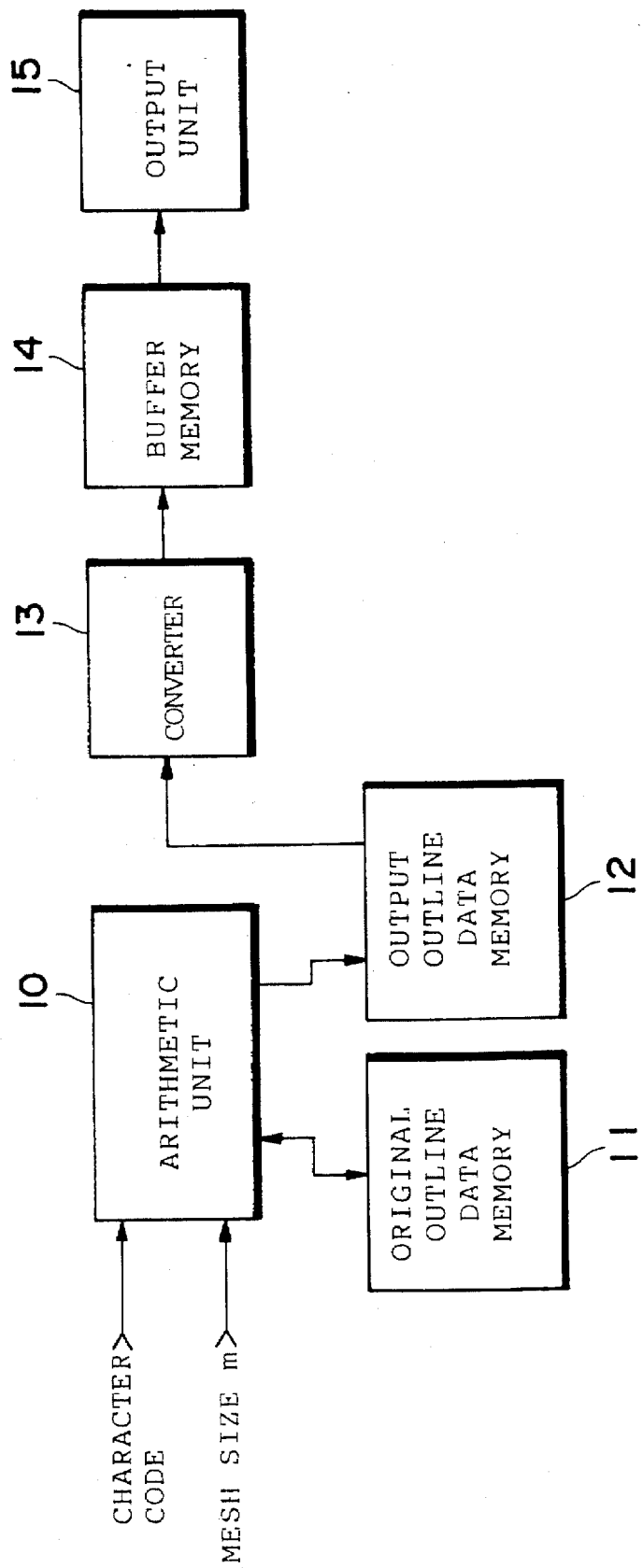
FIG. 1 is a block diagram illustrating the general construction of a character pattern generator.

FIG. 1 illustrates the general construction of a character pattern generator which internally incorporates a unit for adjusting the line width of outline fonts according to the present invention, or which practices a method of adjusting the line width of outline fonts according to the present invention.

Original outline data representing outline fonts are created for respective ones of a large variety of characters used, and the data is stored in an original outline data memory 11 in advance. The memory 11 is realized by a ROM or RAM. A character code representing a character to be outputted and a mesh size (or unit size) m, which is related to the size and resolution of the character to be outputted, are applied to an arithmetic unit 10. The arithmetic unit 10 goes to the memory 11 to read out original outline data regarding a character designated by a character code, executes size-enlargement or reduction processing in conformity with the applied mesh size m, executes processing for adjusting line widths and creates output outline data. The output outline data created is stored temporarily in an output outline data memory (a RAM, for example) 12. The output outline data is read out by a converter 13. Processing such as that for painting in, or filling, the outline represented by output outline data is executed in the converter 13 so as to create dot data representing the output character. The dot data is accumulated temporarily in a buffer memory 14. When creation of the dot data regarding a number of collected characters (one line of characters, for example) ends, this dot data is visually outputted (printed or displayed) by an output unit 15, such as a printer or display unit. The arithmetic unit 10 and converter 13 preferably are realized by part of a computer system, though special-purpose hardware may be used to fabricate them.

The mesh size m of a character to be outputted depends upon the designated character size and the resolution of the output unit. In accordance with the US-style point system, the size (the length of one side) of a 72-point character is one inch. Let the designated character size be A points, and let the resolution of the output unit, e.g., a printer, be B dpi (dots per inch). In such case the mesh size m will be expressed by the following equation:

$$m = (A/72) \times B \qquad \text{Eq. 1}$$

This signifies a mesh size corresponding to the designated character size.

FIRST EMBODIMENT

According to a first embodiment, when a designated character possesses a plurality of horizontal lines, the line widths of these horizontal lines are adjusted so as to be equal.

The kanji character "目" can be mentioned as one example of such a character. The kanji "目" is composed of two vertical lines and four horizontal lines. The line widths of the four horizontal lines are adjusted so as to be equal in the output outline data.

Figure 3:
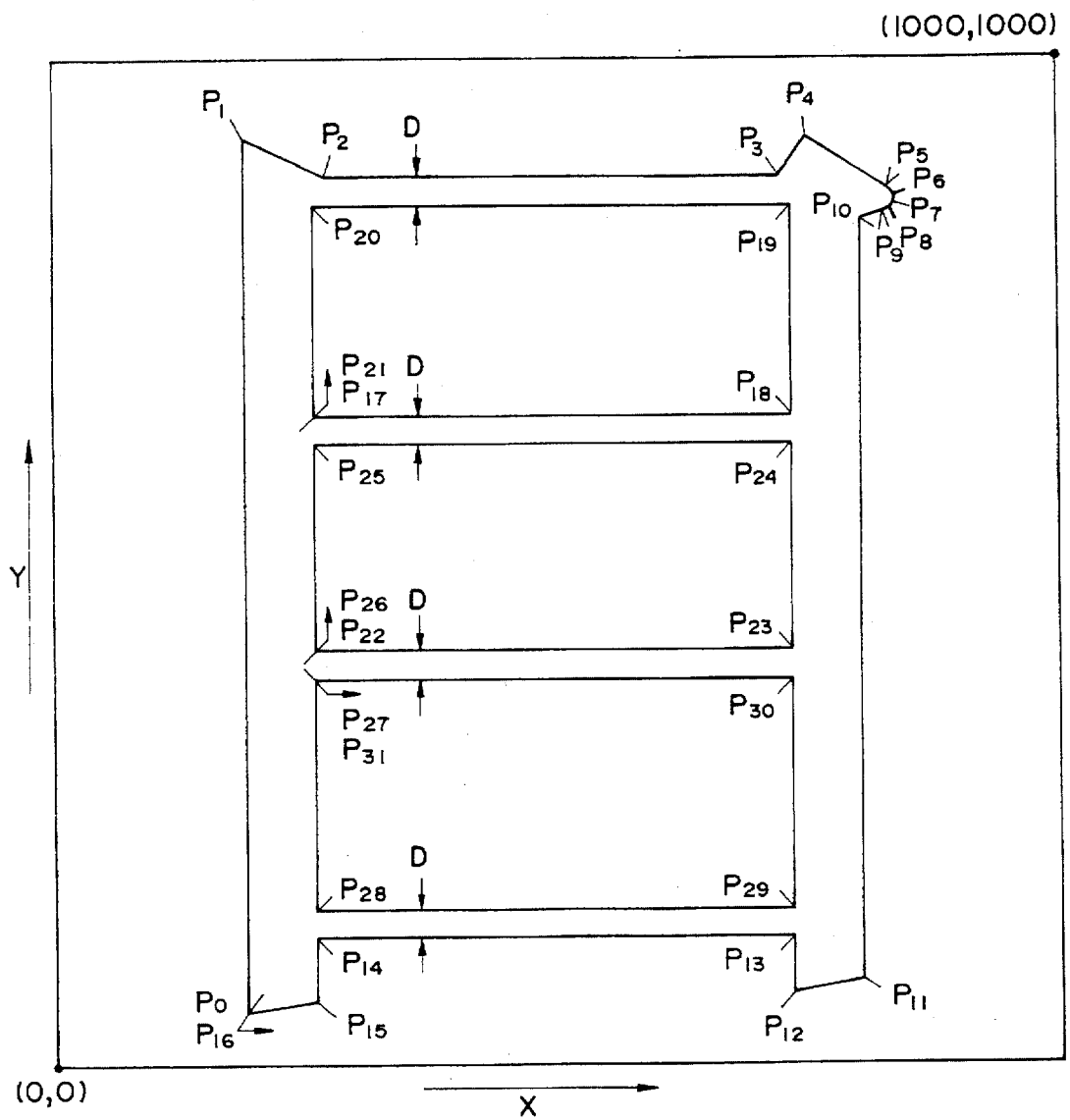
FIG. 3 illustrates an example of an original outline font represented by the original outline data of FIG. 2.

FIG. 2 illustrates an example of the original outline data of the kanji "目", and FIG. 3 represents the kanji "目" expressed by this original outline data.

An outline font approximately expresses the outline of a character by straight lines or curves. The end points of the straight lines or curves forming the outline of a character, as well as other characteristic points (these points are referred to as "data points"), are represented by XY coordinates. Original outline data is such that X, Y coordinate values of the data points are arranged in accordance with a fixed rule (e.g., a rule stating that the exterior contour line is connected first starting from a point at the lower left, after which interior contour lines are connected). In FIGS. 2a and 2b, an X coordinate value and a Y coordinate value are stored in correspondence with a Point No. (point number) of each data point. The positions of data points on the character area as shown in FIG. 3.

Let M represent the mesh size of original outline data. In the example of FIGS. 2a and 2b, M=1000. The origin (0,0) of the XY coordinates is taken at the lower left corner. The X, Y coordinate values of the data points are given as positive integers or 0.

As will be understood from FIG. 3, the line widths (number of dots) D of the four horizontal lines constituting the kanji "日" are set to be equal. With regard to horizontal line widths D set to be equal in terms of the original outline data, a plurality of horizontal line widths are adjusted so as to be equal by processing, described later, even in output outline data obtained by an enlargement or reduction in conformity with the designated mesh size m.

Figure 4:
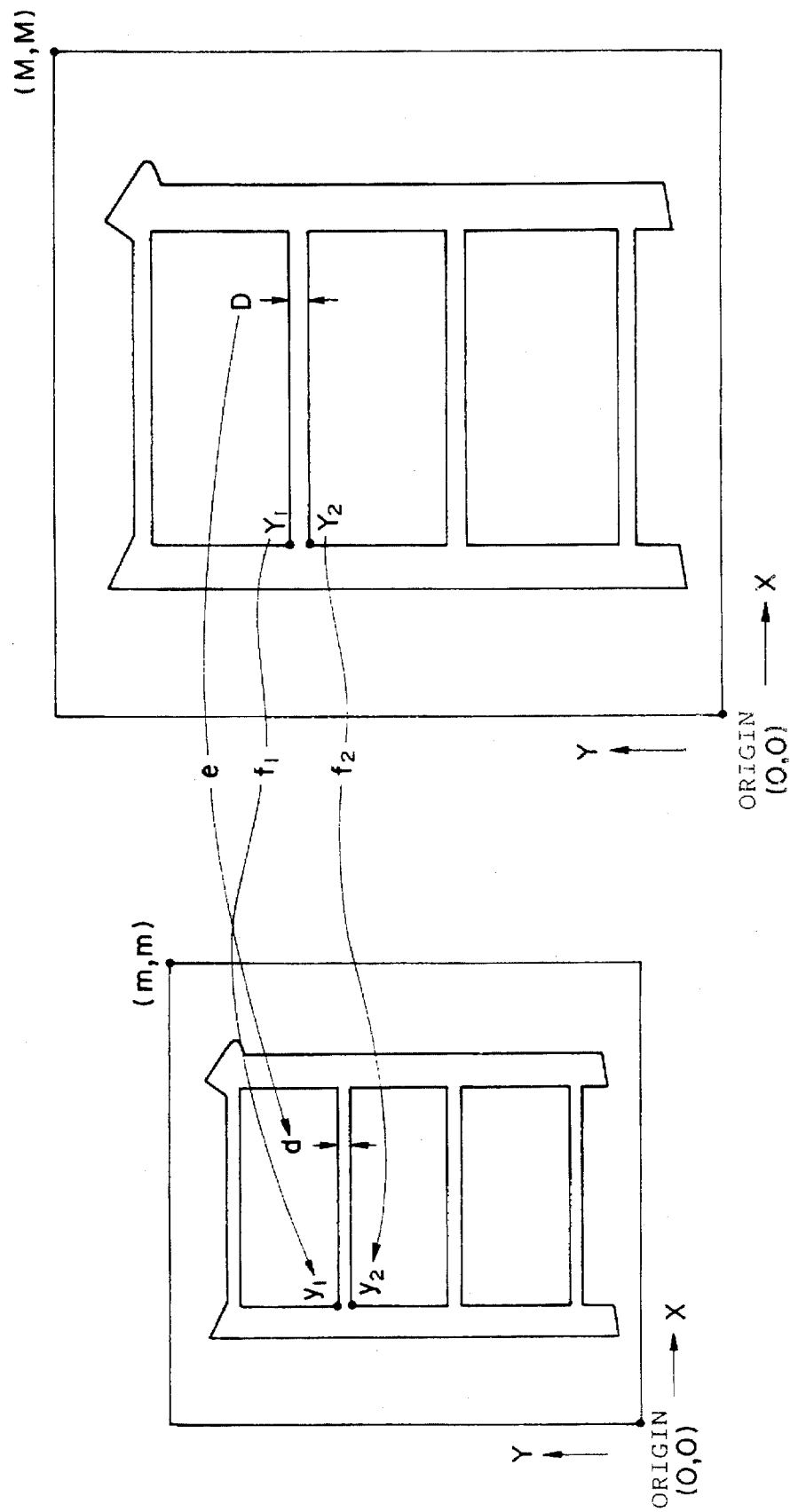
FIG. 4 illustrates the relationship between an original outline font and an output outline font.

FIG. 4 shows a comparison between the character "日" represented by original outline data and a character "日" represented by output outline data obtained by enlarging or reducing the first-mentioned character "日".

The Y coordinate value of the contour line on the upper side of a horizontal line constituting the character generally is represented by $Y_1$, and the Y coordinate value of the contour line on the lower side of the horizontal line generally is represented by $Y_2$. Accordingly, the following equation holds:

$$Y_1 - Y_2 = D \qquad \text{Eq. 2}$$

For example, the Y coordinate value (which corresponds to $Y_1$) of a data point $P_{17}$ (or $P_{21}$) is 648, and the Y coordinate value (which corresponds to $Y_2$) of a data point $P_{25}$ is 620. In the original outline data shown in FIGS. 2a and 2b, the line width D is set to 28.

It goes without saying that the Y coordinate values of all points on the upper or lower contour line representing a horizontal line are equal. For example, the Y coordinate values of data points $P_{17}$ and $P_{18}$ are equal, and the Y coordinate values of data points $P_{25}$ and $P_{24}$ are equal.

The Y coordinate value $Y_1$ of the upper contour line representing a horizontal line having width, the Y coordinate value $Y_2$ of the lower contour line and the line width D perform a very important role in processing for adjusting line width illustrated below. Original outline data is accompanied by attribute data in correspondence with each data point (see FIGS. 2a and 2b). Attribute data has the following meanings:

attribute data 0: a data point not requiring line-width adjustment;

attribute data 1: a data point having a Y coordinate value classified as $Y_1$; and attribute data 2: a data point having a Y coordinate value classified as $Y_2$.

In FIGS. 2a and 2b, for example, data points $P_0$, $P_1$, etc. are not on contour lines representing a horizontal line and, hence, the attribute data for these data points is 0. Data points $P_2$, $P_3$, $P_{17}$, $P_{18}$, etc. lie on upper contour lines forming horizontal lines and therefore have attribute data 1. Data points $P_{20}$, $P_{19}$, $P_{25}$, $P_{24}$, etc. lie on lower contour lines forming horizontal lines and therefore have attribute data 2.

Original outline data is accompanied also by line-width category data in correspondence with each data point. However, this will be described in detail in second and third embodiments.

Furthermore, the original outline data of each character is stored with an accompanying line width D. Numeric data (e.g., D=28; see FIGS. 2a and 2b) representing the line width D may be stored in the original outline data memory 11 in correspondence with each character, or a code commanding the line width D may be stored in correspondence with each character. In the latter case, items of numeric data representing line widths are stored in memory beforehand, in the form of a separate table, in correspondence with codes. Since the number of types of line widths generally used is limited, a smaller memory capacity would suffice with the latter method.

In a character represented by output outline data, let $y_1$ represent the Y coordinate value of an upper contour line constituting a horizontal line, and let $y_2$ represent the Y coordinate value a lower contour line constituting the horizontal line. If the line width (number of dots) of horizontal lines is adjusted to be d, the following equation will hold:

$$y_1 - y_2 = d \qquad \text{Eq. 3}$$

Since these Y coordinate values $y_1$, $y_2$ are values that result after a line-width adjustment is performed, they are positive integers or 0. The line width d is a positive integer.

Figure 5:
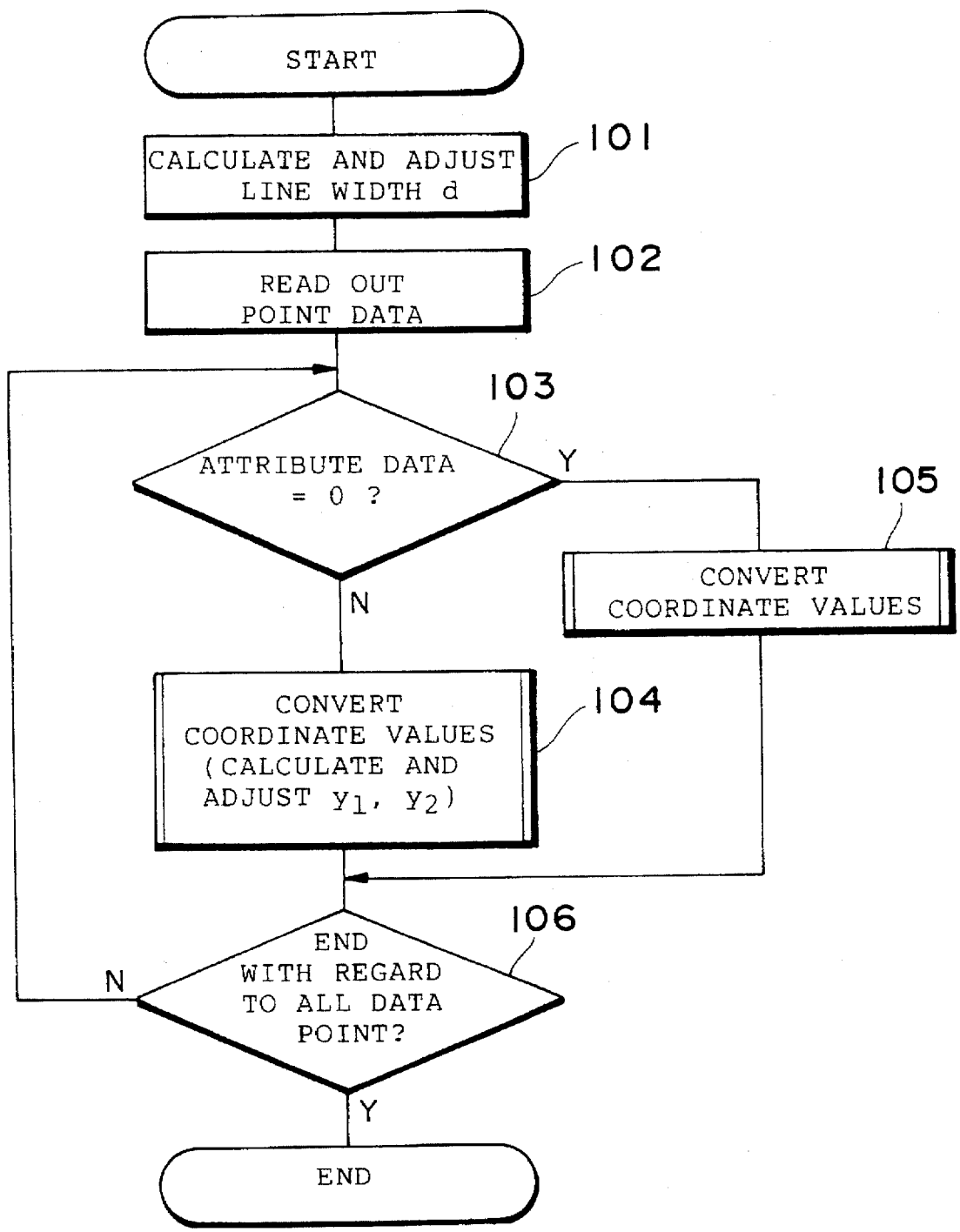
FIG. 5 is a flowchart illustrating the procedure for generating output-font data.

FIG. 5 illustrates a processing procedure in the arithmetic unit 10 for generating output outline data based upon original outline data with regard to a character designated by a character code.

The line width d in output outline data is obtained based upon the given mesh size m as well as line width D and mesh size M in predetermined original outline data (step 101). Here M and D may be any values and are not limited to the example shown in FIGS. 2a and 2b. The same is true with regard to m as well.

First, the operation given by the following equation is performed:

$$e = D \times (m/M) \qquad \text{Eq. 4}$$

The value e obtained is not limited to a positive integer. In general, the value has a fraction following the decimal place. In the calculation of Equation 4, it is preferred that the number of places following the decimal point at which calculation is to be halted be determined in advance in consideration of the fact that there are cases in which indivisibility occurs. This holds true with regard also to values $f_1$, $f_2$ described later.

The range of the value e is represented by the following equation, where it is assumed that a is a positive integer or 0:

$$a \leq e < a+1 \qquad \text{Eq. 5}$$

[where the range of value e is a<e<a+1 (a=0) when e<1 holds]

A method of processing a fraction following the decimal place of the calculated value e and obtaining the line width d is determined in advance. The method employed may be rounding to the nearest whole number, counting fractions following the decimal point as a whole number or disregarding fractions. In general, this may be expressed as follows:

d=a or a+1 when a<e<a+1 holds (where a≠0);

d=a when e=a holds (where a≠0); and $$d=1 \text{ when } e<1 \text{ holds} \qquad \text{Eq. 6}$$

The calculated line width d is stored in memory (e.g., a work area of a memory located in the arithmetic unit 10). In the processing of the fraction of value e, a character having a line width of a standard thickness is obtained if rounding to the nearest whole number is performed, a character having a thick line width is obtained if fractions following the decimal place are counted as a whole number, and a character having a thin line width is obtained if fractions are disregarded. Accordingly, the thickness of a horizontal line can be selected by performing programming in advance or by a mode switch.

One character of original outline data is read out of the original outline data memory 11 (step 102). With regard to data (point data) comprising the X coordinate value, Y coordinate value and attribute data of one data point, it is determined whether the attribute data thereof is 0 or otherwise (step 103). If the attribute data is 1 or 2, this means data point forming the upper or lower contour line of a horizontal line, and therefore the Y coordinate value is $Y_1$ or $Y_2$. The Y coordinate value is converted into the Y coordinate value $y_1$ or $y_2$ in the output outline data upon taking into account the line width d determined earlier (step 104).

By substituting the Y coordinate value $Y_1$ or $Y_2$ read out of the memory 11 into Equation 2, first the other Y coordinate value $Y_2$ or $Y_1$ is calculated, then the calculation of the following equations is performed using $Y_1$, $Y_2$:

$$f_1 = Y_1 \times (m/M) \qquad \text{Eq. 7}$$

$$f_2 = Y_2 \times (m/M) \qquad \text{Eq. 8}$$

The values $f_1$, $f_2$ obtained also generally possess fractions following the decimal point. Let $b_1$, $b_2$ represent the whole-number parts of the values $f_1$, $f_2$, respectively, and let $c_1$, $c_2$ represent the decimal parts, respectively. We then have $$f_1 = b_1 + c_1 \qquad \text{Eq. 9}$$

$$f_2 = b_2 + c_2 \qquad \text{Eq. 10}$$

In general, the values $f_1$, $f_2$ having fractions following the decimal point are adjusted to integral values $y_1$, $y_2$, which are 0 or positive, by the following method upon taking the line width d into account:

When $b_1 - b_2 = d - 1$ holds:     Eq. 11
$y_1 = b_1 + 1$
$y_2 = b_2$
  (where $c_1$ is raised and $c_2$ is discarded);
when $b_1 - b_2 = d$ holds:
$y_1 = b_1 + 1$
$y_2 = b_2 + 1$
  in case of $c_1 \geq 1 - c_2$; and
$y_1 = b_1$
$y_2 = b_2$
  in case of $c_1 < 1 - c_2$.
(Here $c_1$ and $1 - c_2$ are compared and the larger is put to use. When $c_1 = 1 - c_2$ holds, $c_1$ is put to use).
When $b_1 - b_2 = d + 1$ holds:
$y_1 = b_1$
$y_2 = b_2 + 1$.
(Here $c_1$ is discarded and $c_2$ is raised).

Of the Y coordinate values $y_1$, $y_2$ thus obtained, that y coordinate value ($y_1$ in case of $Y_1$ and $y_2$ in case of $Y_2$) corresponding to the Y coordinate value read out of the memory 11 is employed (i.e., the value is stored in a suitable buffer or memory 12).

The X coordinate value of the original outline data also is calculated in accordance with an enlargement ratio or reduction ratio m/M, and fractions following the decimal point are adjusted by rounding to the nearest whole number, by counting fractions as a whole number or by disregarding fractions. In general, since the number of vertical lines contained in kanji is small in comparison with the number of horizontal lines, it is not always necessary to adjust line widths to be equal, as is done in the case of horizontal lines. However, line widths may be adjusted to be equal even with regard to vertical lines, as will be mentioned in a fourth embodiment described later.

In any case, when the X, Y coordinate values in the output outline data are obtained with regard to one data point by the above-described processing, these are stored in the memory 12 (or a suitable buffer).

If attribute data is 0, processing for adjusting the line widths of horizontal lines to be equal is unnecessary. The original outline data is converted into output outline data in accordance with the magnification m/M, processing for adjusting the fraction following the decimal point is executed and the data obtained is stored in the memory 12 (or a suitable buffer) (step 105).

The processing of steps 103–105 is repeatedly executed with regard to all of the original outline data representing one character (step 106).

A modification of the method (step 104) of adjusting the Y coordinate values $y_1$, $y_2$ in the output outline data will be described.

A first modification will now be set forth.

After the values $f_1$, $f_2$ are calculated in accordance with Equations 7 and 8, the following calculations are performed:

$$g_1 = f_1 + [d - (f_1 - f_2)]/2 \qquad \text{Eq. 12}$$

$$g_2 = f_2 + [d - (f_1 - f_2)]/2 \qquad \text{Eq. 13}$$

Let $y_1$, $y_2$ represent the values obtained by rounding the decimal parts of the thus obtained values $g_1$, $g_2$, respectively, to the nearest whole number. The values $y_1$, $y_2$ obtained in this manner satisfy Equation 3. The reason is as follows:

From Equations 12 and 13, we have $$g_1 - g_2 = d \qquad \text{Eq. 14}$$

Equation 14 indicates that the decimal part of value $g_1$ and the decimal part of $g_2$ are equal. Since $g_1$ is obtained from $y_1$ and $g_2$ from $y_2$ by rounding off the decimal parts, whose values are equal, to the nearest whole number, the difference between $y_1$ and $y_2$ thus obtained also should be equal to d.

When the values of the decimal parts of values $g_1$ and $g_2$ are 0.5, they are raised by being rounded off to the nearest whole number. This corresponds to the case $c_1 = 1 - c_2$ in Equation 11.

A second modification will now be described.

In accordance with the two methods set forth above, the Y coordinate values $y_1$ and $y_2$ in the output outline data are found using the Y coordinate values $Y_1$ and $Y_2$. In the second modification, $y_1$ is calculated solely from $Y_1$ and $y_2$ is calculated solely from $Y_2$, as a result of which processing is simplified.

The points on which this modification is premised will be described first.

In a case where the mesh size M of original outline data is 200, 400, 800 or 1000, etc., the above-mentioned values e, $f_1$, $f_2$ are divisible values (see Equations 4, 7, 8). Accordingly, the number of places in the decimal part to be calculated is determined in such a manner that the values e, $f_1$, $f_2$ will be divisible.

The following equation holds from Equation 2:

$$Y_1 \times (m/M) - Y_2 \times (m/M) = D \times (m/M) \qquad \text{Eq. 15}$$

Accordingly, if e, $f_1$, $f_2$ are divisible, the following equation holds from Equations 4, 7, 8, 15:

$$f_1 - f_2 = e \qquad \text{Eq. 16}$$

If the mesh size M is determined arbitrarily, the values e, $f_1$, $f_2$ often will be indivisible values. In such case, Equation 16 will not necessarily hold. In a case where the values e, $f_1$, $f_2$ are indivisible values, the number of places to be calculated in the decimal parts of these values is determined to be as large as possible (e.g., calculation is performed up to four or more places after the decimal point).

In accordance with the second modification, which is premised on the foregoing, if the Y coordinate value of the original outline data read out of the memory 11 is $Y_1$, the calculation indicated by the following equation is performed using the values e and d, calculated at step 101 (Equations 4, 6), after $f_1$ is found in accordance with Equation 7:

$$h_1 = f_1 + (d-e)/2 \quad \text{Eq. 17}$$

The Y coordinate value $y_1$ is obtained by rounding off the decimal part of the value $h_1$, obtained in accordance with Equation 17, to the nearest whole number.

In a case where the Y coordinate value read out of the memory 11 is $Y_2$, the calculation indicated by the following equation is performed using the already calculated values e and d after $f_2$ is found in accordance with Equation 8:

$$h_2 = f_2 - (d-e)/2 \quad \text{Eq. 18}$$

The Y coordinate value $y_2$ is obtained by rounding off the decimal part of the value $h_2$, obtained in accordance with Equation 18, to the nearest whole number.

The reason why the coordinate values $y_1$, $y_2$ are obtained while assuring that the line width d will always be equal by virtue of the foregoing method is as follows:

In a case where the values e, $f_1$ and $f_2$ are divisible, Equation 16 holds, as mentioned above. Therefore, the following equation is obtained using Equations 16, 17 and 18:

$$h_1 - h_2 = d \quad \text{Eq. 19}$$

Since the line width d is a positive integer, the decimal part of the value $h_1$ and the decimal part of the value $h_2$ should be equal values. Since the Y coordinate values $y_1$, $y_2$ are obtained by rounding off these values $h_1$, $h_2$ to the nearest whole number, $y_1$ and $y_2$ thus obtained also will satisfy Equation 3. That is, the difference between $y_1$ and $y_2$ will be equal to the line width d at all times.

If the values e, $f_1$, $f_2$ are indivisible values, a case is possible in which either the decimal part of value $h_1$ or the decimal part of value $h_2$ will be equal to or greater than 0.5 while the other is less than 0.5. In such case, Equation 3 will not hold. However, by taking the numbers of places of the decimal parts of values e, $f_1$, $f_2$ to be large, the probability that this situation will occur can be made very small.

SECOND EMBODIMENT

In the second embodiment, it is arranged so that the line widths of a plurality of horizontal lines in one character can be made to differ by at least two grades or so that the line width of a horizontal line in a certain character can be made to differ from the line width of a horizontal line in another character. The former is useful when it is deemed that making the line width of a specific horizontal line in output outline data larger or smaller than the line width of another horizontal line is better in terms of the quality of the outputted character. The latter is useful in a case where an outputted kanji will be rendered incomprehensible if the number of horizontal lines is very large and the original outline data is merely reduced in size.

At any rate, the second embodiment is effective in a case where use is made of an output unit having an especially low resolution, namely a case in which output outline data having a small mesh size is created. Accordingly, it is preferred that the upper limit of the mesh size at which line-width adjustment according to the second embodiment is to be performed be determined in advance.

In the original outline data, use is made of line-width category data contained in the data of each data point. For example, line-width category data is defined as follows:

Line-width category data 1: a case in which a somewhat larger line width is adopted;

Line-width category data 2: a case in which a smaller line width is adopted.

In this embodiment, the premise is that the line widths D of a plurality of horizontal lines contained in one character are equal in the original outline data. Accordingly, the original outline data illustrated in FIGS. 2 and 3 is capable of being referred to in this embodiment as well. However, only 1 is set as the line-width category data in the original outline data of FIG. 2. As for data points that do not require adjustment of line width, 0 is set as the line-width category data.

The line-width category data generally is created by a trial-and-error method in which setting of the data, creation of output outline data and outputting of the character are repeated. Individual items of line-width category data may be set in conformity with the range of designated mesh sizes. Line widths can be set not only to two grades but to three or more grades as well.

The creation of output outline data is carried out basically in accordance with the processing procedure shown in FIG. 5 in the second embodiment as well. Those aspects of processing that differ from that of the first embodiment will be described.

Preferably, in correspondence with the original outline data of each character, the type of line-width category data used in this data (i.e., whether only category 1 is used or both categories 1 and 2) is stored in memory beforehand.

The value e is obtained using Equation 4 in accordance with the designated mesh size.

The range of the value e must be $$a \leq e < a+1 \text{ (where a is a positive integer)} \quad \text{Eq. 20}$$

In the case e<1, the line-width adjustment of this embodiment is not applied. That is, by virtue of this expedient, the lower limit of mesh size for which the line-adjustment according to this embodiment is possible is stipulated.

The following two types of line widths $d_1$ and $d_2$ are determined in the output outline data, and these are stored in memory (step 101):

$$d_1 = a+1$$
$$d_2 = a \quad \text{Eq. 21}$$

Next, by using the original outline data read out of the memory 11, a check is performed to determine whether the attribute data of each data point is 0 or not. If the attribute data is other than 0, then coordinate-value converting processing, inclusive of line-width adjustment, is executed (steps 102, 103, 104).

Though the line-width adjustment processing is the same as the processing in accordance with Equations 7 through 11 in the first embodiment, processing is added for selecting one of the above-mentioned two line widths $d_1$, $d_2$ in accordance with the line-width category data contained in the point data read out. More specifically, $d_1$ is selected as the line width if the line-width category data is 1, and $d_2$ is selected if the line-width category data is 2. In the calculation in accordance with Equation 11, the selected $d_1$ or $d_2$ is used instead of d and the Y coordinate values $y_1$, $y_2$ in the output outline data are obtained.

Though there will be some increase in the processing procedure, an arrangement may be adopted in which $d_1$ or $d_2$ is decided on the basis of Equation 21 whenever the line-width category data is read out.

The first and second modifications of the first embodiment also are applicable to the second embodiment.

In the first modification, d in Equation 12 or 13 need only be replaced by the line width $d_1$ or $d_2$ selected in accordance with the line-width category data.

In the second modification, d in Equation 17 or 18 need only be replaced by the line width $d_1$ or $d_2$ selected in accordance with the line-width category data.

THIRD EMBODIMENT

Figure 7:
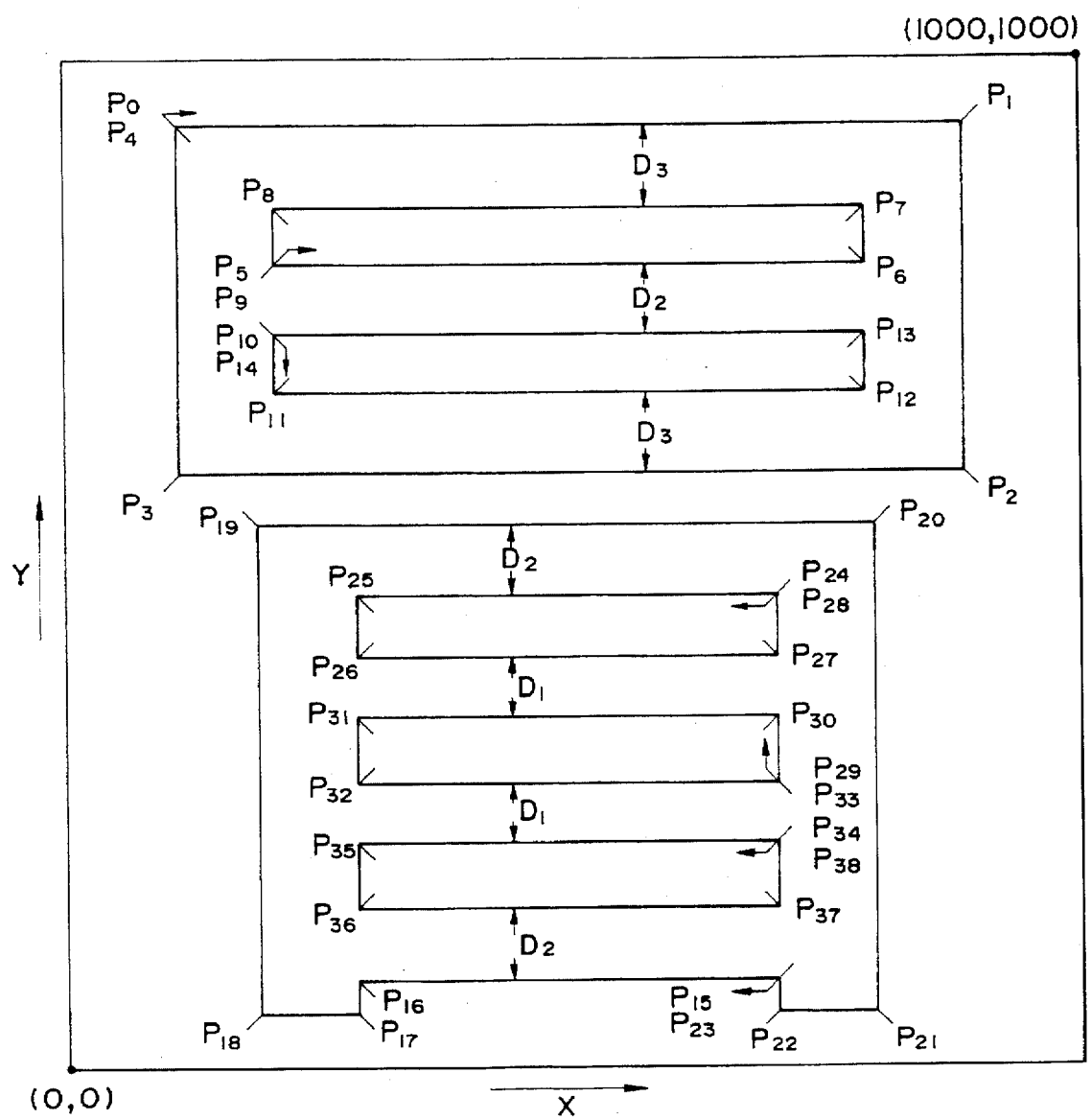
FIG. 7 illustrates an example of an original outline font represented by the original outline data of FIG. 6.

In the third embodiment, the line widths of a plurality of horizontal lines differ in the original outline data of one character. One example of such original outline data is illustrated in FIGS. 6 and 7 with regard to the kanji character "冒". Here three types of line thicknesses $D_1$, $D_2$ and $D_3$ are used. The values D1=60, D2=70, D3=80 of these line widths (numbers of dots) are stored beforehand in a memory 11 or some other memory in correspondence with the original outline data of the character "冒". As mentioned above, codes indicating line widths may be stored beforehand in correspondence with the original outline data of the character "冒" in memory 11, and the numerical values indicating the specific line widths may be stored in the form of a table in correspondence with these codes. In such case, data of the equal line width D in the first embodiment may also be stored in this table along with the above-mentioned data.

The line-width category data also is provided in the three types 1, 2 and 3 in correspondence with the line widths $D_1$, $D_2$ and $D_3$. It is preferred that the types of line-width category data used in the original outline data also be stored in correspondence with the original outline data. The attribute data is the same as that indicated in the first embodiment.

Since the plural types of line widths $D_1 \sim D_n$ have been set in the third embodiment, corresponding plural types of line widths $d_1 \sim d_n$ in the output outline data are calculated and fractions are processed (this processing corresponding to step 101). In the foregoing Equations 4~6, $e_i$ is substituted for e, $a_i$ for a and $d_i$ for i, and the calculations are then performed with regard to i=1~n, whereby line widths $d_1 \sim d_n$ are obtained. These line widths $d_1 \sim d_n$ are stored in memory.

Operations in accordance with Equations 7~11 are performed in line-width adjustment processing (which corresponds to steps 102~104) as well. Any of the n-number of line widths $d_1 \sim d_n$ is selected in accordance with the line-width category data contained in the point data read out. In the operation of Equation 11, the selected line width (any of $d_1 \sim d_n$) is used in place of d to obtain the Y coordinate values $y_1$, $y_2$. Other processing is the same as in the case of the first embodiment shown in FIG. 5.

An arrangement may be adopted in which, whenever the line-width category data is read out, the corresponding one of the line widths $d_1 \sim d_n$ is adjusted.

The line-width adjustment processing of the first and second modifications of the first embodiment also are applicable to the third embodiment.

In the first modification, d in Equation 12 or 13 need only be replaced by the line width (any of $d_1 \sim d_n$) selected in accordance with the line-width category data.

In the second modification, d and e in Equation 17 or 18 need only be replaced by the line width $d_i$ (any of i=1~n), which is selected in accordance with the line-width category data, and $e_i$ corresponding thereto.

FOURTH EMBODIMENT

The fourth embodiment relates to a line-width adjustment regarding vertical lines. All of the above-described line-width adjustment processing regarding horizontal lines is applied as is to line-width adjustment for vertical lines. In the original outline data, let $X_1$ denote the X coordinate value of a data point on a right-side contour line representing one vertical line, let $X_2$ denote the X coordinate value of a data point on a left-side contour line representing the one vertical line, and let $x_1$, $x_2$ denote the X coordinate values, in the output outline data, corresponding to these X coordinate values $X_1$, $X_2$, respectively. It will suffice to substitute the X coordinate values $X_1$, $X_2$, $x_1$, $x_2$ for the above-mentioned Y coordinate values $Y_1$, $Y_2$, $y_1$, $y_2$ in the line-width adjustment of horizontal lines described above.

The first and second modifications also are applicable to the line-width adjustment of vertical lines as a matter of course.

An arrangement can also be adopted in which both line-width adjustment of horizontal lines and line-width adjustment of vertical lines is carried out. In such case, attribute data and line-width category data for horizontal lines as well as attribute data and line-width category data for vertical lines would be included in the original outline data.

INDUSTRIAL APPLICABILITY

In accordance with the apparatus and method for adjusting the line width of outline fonts according to the invention, outline data of one type of outline font can be applied to a printer or display unit in various mesh sizes (the mesh size depends upon the character size and resolution). As a result, the invention is utilized in a computer system which includes a printer or display unit, and in a character generator thereof. More specifically, the invention is utilized in the manufacturing industry as regards printers, display units, word processors, computer systems, editing systems and computer phototypesetting systems, etc.

What is claimed is:

1. An apparatus for adjusting a line width of an outline font, said apparatus comprising:

original outline data storing means for storing (i) original coordinate-value data defining a character outline as a set of data points; and (ii) attribute data indicating whether a particular data point in the set of data points is a point at which line width is to be adjusted, the attribute data being stored in correspondence with original coordinate-value data;

original line-width data storing means for storing data representing an original line width of at least a portion of the character outline in correspondence with the original coordinate-value data;

line-width converting means for converting the original line-width data into fraction-processed output line-width data based on a mesh size corresponding to a designated character size; and coordinate-value converting means, operative when original coordinate-value data read out of said original outline data storing means is accompanied by attribute data indicating that line width is to be adjusted, for converting the original coordinate-value data defining a character outline into fraction-processed output coordinate-value data using the fraction-processed output line-width data such that a line width represented by the fraction-processed output coordinate-value data is set equal to a line width represented by the fraction-processed output line-width data.

2. An apparatus for adjusting a line width of an outline font, said apparatus comprising:

original outline data storing means for storing (i) original coordinate-value data defining a character outline as a set of data points, the character outline containing a plurality of character lines having substantially equal original line widths; (ii) attribute data indicating whether a particular data point in the set of data points is a point at which line width is to be adjusted; and (iii) line-width category data indicating a grade of line width thickness which varies based on an output line width that varies based on a mesh size of a prescribed range irrespective of the original line width, the attribute data and the line-width category data being stored in correspondence with original coordinate-value data of the data point;

original line-width data storing means for storing data representing the original line width in correspondence with original outline data of each character;

means for creating output line-width data representing a plurality of different, fraction-processed output line widths based upon the original line-width data and the line-width category data based on the mesh size corresponding to a designated character size; and means, operative when original coordinate-value data read out of said original outline data storing means is accompanied by attribute data indicating that line width is to be adjusted, for converting the original coordinate-value data into fraction-processed output coordinate-value data using selected output line-width data such that a line width represented by the fraction-processed output coordinate-value data is set equal to an output line width represented by the output line-width data selected in accordance with the line-width category data.

3. An apparatus for adjusting a line width of an outline font, said apparatus comprising:

original outline data storing means for storing (i) original coordinate-value data defining a character outline as a set of data points, the character outline containing a plurality of character lines having different original line widths; (ii) attribute data; and (iii) line-width category data, the attribute data indicating whether a data point is a point at which line width is to be adjusted, and the line-width category data indicating categories of thickness of line width in correspondence with the different original line widths;

original line-width data storing means for storing data representing original line widths of a plurality of categories in correspondence with original outline data of each character;

means for converting original line-width data of plurality of categories into fraction-processed output line-width data of a plurality of categories based on a mesh size corresponding to a designated character size; and means, operative when original coordinate-value data read out of said original outline data storing means is accompanied by attribute data indicating that line width is to be adjusted, for converting the original coordinate-value data into fraction-processed output coordinate-value data using selected output line-width data such that a line width represented by the fraction-processed output coordinate-value data is set equal to an output line width represented by the fraction-processed output line-width data selected in accordance with the line-width category data.

4. In a method of storing predetermined original outline data comprising a collection of original coordinate-value data points representing a contour line of a character of an outline font and subjecting the original coordinate-value data to an enlargement or reduction operation based on a mesh size corresponding to a designated character size, thereby generating output outline data comprising a collection of output coordinate-value data, a method of adjusting a line width of the outline font, said method comprising:

setting attribute data in correspondence with original coordinate-value data of each data point in the original outline data, the attribute data indicating whether a particular data point is a point at which line width is to be adjusted, and storing data representing an original line width in correspondence with the original outline data of each character;

converting original line-width data, which corresponds to the original coordinate-value data, into fraction-processed output line-width data based on the mesh size; and when original coordinate-value data that has been read out is accompanied by attribute data indicating that the line width is to be adjusted for the particular data point, converting the original coordinate-value data defining a character outline into fraction-processed output coordinate-value data using the fraction-processed output line-width data such that a line width represented by the fraction-processed output coordinate-value data is set equal to a line width represented by the fraction-processed output line-width data.

5. In a method of storing predetermined original outline data comprising a set of original coordinate-value data points representing a contour line of a character outline containing a plurality of character lines having substantially equal original line widths, and subjecting the original coordinate-value data to an enlargement or reduction operation based on a mesh size corresponding to a designated character size, thereby generating output outline data comprising a set of output coordinate-value data, a method of adjusting a line width of an outline font, said method comprising:

setting attribute data and line-width category data in correspondence with original coordinate-value data of each point in the original outline data, the attribute data indicating whether a particular data point is a point at which line width is to be adjusted, and the line-width category data indicating a grade of thickness of line width which varies based on an output line width that varies depending upon the mesh size of a prescribed range irrespective of the equal original line width, and storing data representing the original line width in correspondence with original outline data of each character;

creating output-line width data representing a plurality of different, fraction-processed output line width based upon the original line-width data and the line-width category data based on the mesh size; and when original coordinate-value data that has been read out is accompanied by attribute data indicating that line width is to be adjusted, converting the original coordinate-value data into fraction-processed output coordinate-value data using selected output line-width data such that a line width stipulated by the fraction-processed output coordinate-value data is set equal to an output line width represented by output line-width data selected in accordance with the line-width category data.

6. In a method of storing predetermined original outline data comprising a set of original coordinate-value data of data points representing a contour line of a character outline containing a plurality of character lines having different original line widths and subjecting the original coordinate-value data to an enlargement or reduction operation based on a mesh size corresponding to a designated character size, thereby generating output outline data comprising a set of output coordinate-value data, a method of adjusting a line width of an outline font, said method comprising:

setting predetermined attribute data and line-width category data in correspondence with original coordinate-value data of each data point in the original outline data, the attribute data indicating whether a particular data point is a point at which the line width is to be adjusted, and the line-width category data indicating categories of thickness of line width in correspondence with the different original line widths, and storing data representing original line widths of a plurality of categories in correspondence with original outline data of each character;

converting original line-width data of a plurality of categories into fraction-processed output line-width data of a plurality of categories in output outline data based on the mesh size; and converting, when original coordinate-value data that has been read is accompanied by attribute data indicating that line width is to be adjusted, the original coordinate-value data into fraction-processed output coordinate-value data using selected fraction-processed output line-width data such that a line width represented by the fraction-processed output coordinate-value data is set equal to an output line width represented by the fraction-processed output line-width data selected in accordance with the line-width category data.

7. A method of adjusting a line width of an outline font according to any one of claims 4, 5 and 6, wherein a character whose line width is adjusted comprises a horizontal line constituting a character.

8. A method of adjusting a line width of an outline font according to any one of claims 4, 5 and 6, wherein a character whose line width is adjusted comprises a vertical line constituting a character.

9. An apparatus for adjusting a line width of an outline font, said apparatus comprising:

original outline data storing means for storing (i) original coordinate-value data defining a character outline as a set of data points; and (ii) attribute data indicating whether a particular data point in the set of data points is a point at which line width is to be adjusted, the attribute data being stored in correspondence with original coordinate-value data of the particular data point; and coordinate-value converting means, operative when original coordinate-value data read out of said original outline data storing means is accompanied by attribute data indicating that line width is to be adjusted, for converting the original coordinate-value data into fraction-processed output coordinate-value data using an output line-width value, which was previously determined based on a mesh size corresponding to a character size, such that a line width represented by output coordinate-value data becomes equal to a line width represented by the output line-width data value.

10. In a method of storing predetermined original outline data comprising a set of original coordinate-value data points representing a contour line of a character outline and subjecting the original coordinate-value data to an enlargement or reduction operation based on a mesh size corresponding to a designated character size, thereby generating output outline data comprising a set of output coordinate-value data, a method of adjusting line width of an outline font, said method comprising:

setting attribute data in correspondence with original coordinate-value data of each data point in the original outline data, the attribute data indicating whether a particular data point is a point at which line width is to be adjusted; and converting, when original coordinate-value data that has been read out is accompanied by attribute data indicating that the line width is to be adjusted, the original coordinate-value data into fraction-processed output coordinate-value data using an output line-width value, which is predetermined based on the mesh size, such that a line width represented by the output coordinate-value data is set equal to a line width represented by the output line-width value.

* * * * *